(12) United States Patent
Gysin et al.

(10) Patent No.: US 9,204,082 B2
(45) Date of Patent: Dec. 1, 2015

(54) SET BACK BOX

(75) Inventors: Mark William Gysin, Noblesville, IN (US); Glen Wakeman Ruch, Indianapolis, IN (US)

(73) Assignee: THOMAS LICENSING, Issy-les Moulineaux (FR)

( * ) Notice: Subject to any disclaimer, the term of this patent is extended or adjusted under 35 U.S.C. 154(b) by 113 days.

(21) Appl. No.: 13/976,207

(22) PCT Filed: Jan. 3, 2012

(86) PCT No.: PCT/US2012/020013
§ 371 (c)(1),
(2), (4) Date: Jun. 26, 2013

(87) PCT Pub. No.: WO2012/094274
PCT Pub. Date: Jul. 12, 2012

(65) Prior Publication Data
US 2013/0278833 A1 Oct. 24, 2013

Related U.S. Application Data

(60) Provisional application No. 61/429,639, filed on Jan. 4, 2011, provisional application No. 61/465,786, filed on Mar. 24, 2011.

(51) Int. Cl.
*H04N 5/64* (2006.01)
(52) U.S. Cl.
CPC ........................................ *H04N 5/64* (2013.01)
(58) Field of Classification Search
CPC ........................................................ H04N 5/64
USPC ................ 361/827, 679.02, 748, 752, 807; 348/725, 726, 109–110, 836; D14/125
See application file for complete search history.

(56) References Cited

U.S. PATENT DOCUMENTS

| 4,384,368 | A | * | 5/1983 | Rosenfeldt et al. | 398/140 |
|---|---|---|---|---|---|
| 4,542,442 | A | * | 9/1985 | Drexler | 361/787 |
| 5,002,502 | A | * | 3/1991 | Hill | 439/536 |
| 5,527,348 | A | * | 6/1996 | Winkler et al. | 607/30 |
| 7,035,112 | B2 | * | 4/2006 | Chen | 361/752 |
| D642,549 | S | * | 8/2011 | Zeinoun et al. | D14/125 |
| 8,773,864 | B2 | * | 7/2014 | Rapp et al. | 361/752 |
| 2001/0051766 | A1 | * | 12/2001 | Gazdzinski | 600/309 |
| 2002/0171774 | A1 | * | 11/2002 | Lee | 348/731 |

(Continued)

FOREIGN PATENT DOCUMENTS

EP 1598944 11/2005

OTHER PUBLICATIONS

Search Report dated Apr. 6, 2012.

*Primary Examiner* — Adrian S Wilson
*Assistant Examiner* — Abhishek Rathod
(74) *Attorney, Agent, or Firm* — Robert D. Shedd; Richard LaPeruta (57) ABSTRACT

A set back box is provided that comprises: an outer housing having one input side and one output side; stacked printed circuit boards within the outer housing; an input panel for receiving at least one input electrical cable at the one input side; and an output panel for providing signal to a display through at least one output cable at the output side. A strain relief cable is also provided that connects to the output side, wherein the strain relief cable is configured to attach to the display and configured to ensure any output cables are not under tension.

12 Claims, 10 Drawing Sheets

(56) References Cited

U.S. PATENT DOCUMENTS

| | | | |
|---|---|---|---|
| 2004/0130662 A1* | 7/2004 | Cuthbertson | 348/552 |
| 2005/0162242 A1* | 7/2005 | Ootori et al. | 334/85 |
| 2007/0115359 A1* | 5/2007 | Tey et al. | 348/162 |
| 2007/0141869 A1* | 6/2007 | McNeely et al. | 439/76.1 |
| 2008/0068517 A1* | 3/2008 | Urisu | 348/790 |
| 2008/0099646 A1* | 5/2008 | Kobara et al. | 248/309.1 |
| 2008/0117610 A1* | 5/2008 | Picolli | 361/773 |
| 2009/0077607 A1* | 3/2009 | Doumuki | 725/123 |
| 2010/0013742 A1* | 1/2010 | Unger | 345/55 |
| 2010/0026912 A1 | 2/2010 | Ho | |
| 2011/0019100 A1* | 1/2011 | Lo | 348/725 |
| 2011/0059630 A1* | 3/2011 | Tanaka | 439/65 |

\* cited by examiner

SET BACK BOX

CROSS-REFERENCE TO RELATED APPLICATIONS

This application is a National Stage Application and claims the benefit, under 35 U.S.C. §365 of International Application PCT/US2012/020013 filed Jan. 3, 2012 which was published in accordance with PCT Article 21(2) on Jul. 12, 2012 in English and which claims the benefit of U.S. Provisional Patent Application No. 61/429,639 filed Jan. 4, 2011 and U.S. Provisional Patent Application No. 61/465,786 filed Mar. 24, 2011.

FIELD OF THE INVENTION

The invention is related to set back boxes and mounting of set back boxes.

BACKGROUND OF THE INVENTION

An increasing number of consumers prefer to reduce the visibility of set top boxes. In response, an effort to eliminate set top boxes from view has been undertaken which includes the development of set back boxes. These set back boxes perform the traditional functions of a set top box, but are generally hidden from the field of view.

In one configuration the set back boxes are designed to be supported by and hung by one of its functioning cables that connect to the back a display device.

Even though set back boxes have been configured to have minimal size and to not take up much surface area or volume in entertainment centers, such set back boxes are believed to generate strain on the cables. This strain was unexpected, because cables and the set back box housings are robust objects and the set back boxes are generally designed to be small.

It should also be noted that even though electronic devices such as set top boxes and the like need to become smaller, these devices are still expected to receive signals from service providers such as cable and satellite providers and these devices are expected to able to receive signals transmitted through in-home networks. In short, there is a demand to augment the receiving circuitry capability and functionality of set top boxes even though these devices are expected to be smaller and hidden from view.

Traditionally, much signal receiving circuitry would be included in a television; however, now set top boxes are expected to have such receiving circuitry.

Furthermore, while the size and volume of electronics have shrunk, their functionality has not, and, in fact, their functionality may be increasing with the need to interoperate on multiple networks simultaneously.

Figure 1A:
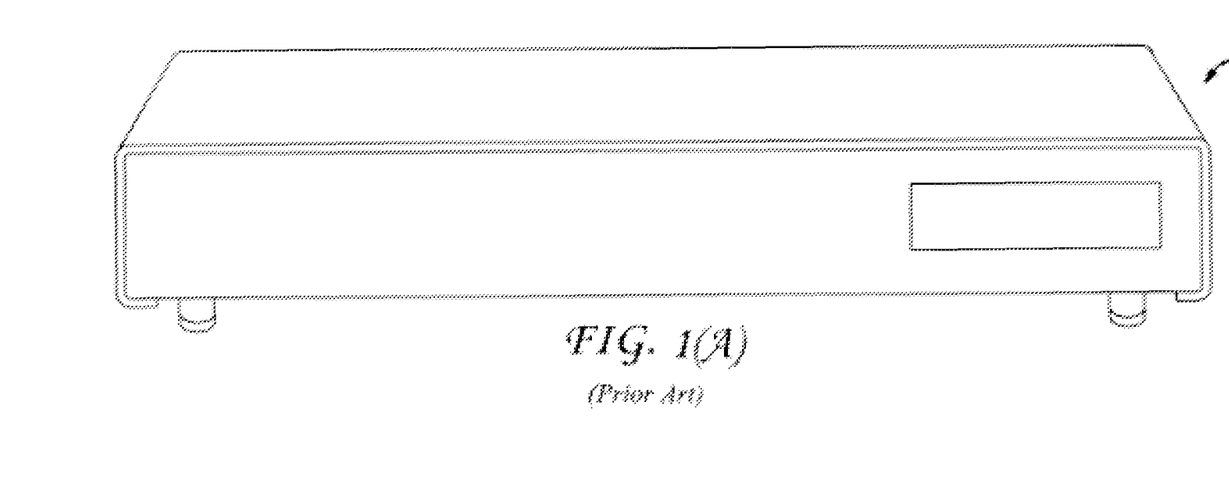
FIG. 1 shows views of a set top box according to the prior art.
Figure 1B:
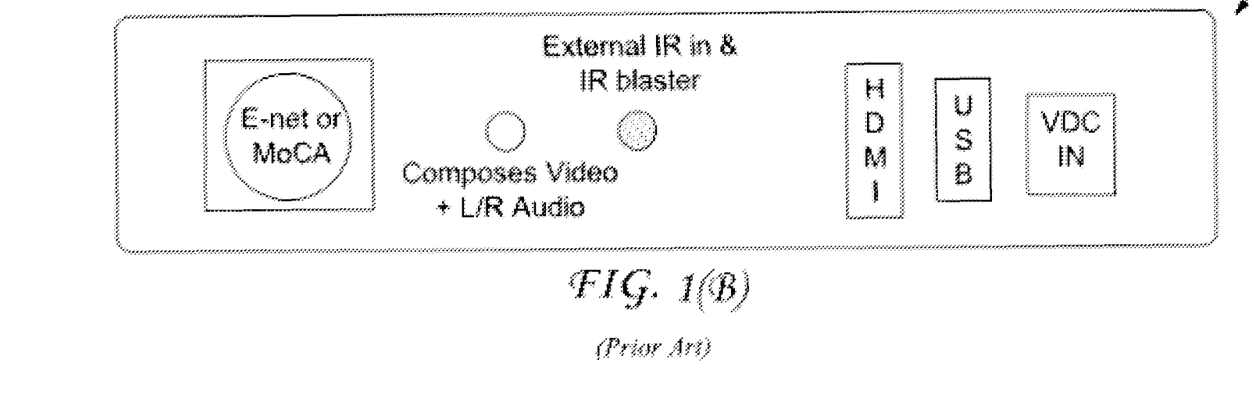

Set top boxes typically connect to a plurality of wires or coaxial cables, which can or need to be long. FIGS. 1A and 1B show views of a set top box 1 according the prior art, wherein FIG. 1B is a rear view of a set top box showing the various input and output connectors which can each receive or connect to cables. The set top box 1 is a conventional set top box which can be 25 mm high and have a single printed circuit board which can, for example, be 95 mm×85 mm and which can support the various functionalities associated with the connectors shown in FIG. 1B. The wires that connect to set top box 1 in FIG. 1B can become an eye-sore. Some have mounted set top boxes inside walls to hide the boxes from view; however, this is cumbersome and may not be encouraged in some households. Some have attached the set back boxes to the backs of displays; however, this approach places displays at risk of damage, because robust adhesive used to facilitate proper mounting can spall the mounting surfaces. Alternatively, keyhole slots placed in the bottom of the set top box for mounting with screws to the walls or displays have been considered; however, additional safeguards in the set top boxes are then need to protect the circuit board from possible short circuits.

The inventive arrangements taught herein address the above-mentioned shortcomings of set top boxes and set back boxes.

SUMMARY OF THE INVENTION

A set back box device which replaces the traditional visible rectangular set top box is provided. The device has all of the functionality of a traditional set top box, but has the advantages of being out of sight (i.e. can be hidden from view behind a television) and requires less space. The device can have printed circuit boards which are fragmented and stacked in a manner that permit the internal contents to be efficiently housed in a cylindrically shaped housing. The device is suspended behind a television by a working electrical cable that connects to the television and the device can have a strain relief cable to reduce damage due to cable pulling on the set back box.

In embodiments of the invention, the set back box comprises: an outer housing having one input side and one output side; stacked printed circuit boards within the outer housing; an input panel for receiving at least one input electrical cable at the one input side; and an output panel for providing signal to a display through at least one output cable at the output side. The set back box can further comprise a strain relief cable connected to the output side, wherein the strain relief cable is configured to attach to the display and is configured to ensure any output cables are not under tension. The set back box can have at least three stacked printed circuit boards, wherein the stacked printed circuit boards can be parallel to one another, and the stacked printed circuit boards can be oriented perpendicular to at least one of the sides.

In other embodiments, the set back box can have three printed stacked circuit boards, wherein a first printed circuit board of the three is over a second printed circuit board of the three, a third printed circuit board of the three is under the second printed circuit board, and the second printed circuit board is wider than the first and second printed circuit boards along a dimension parallel to the input side. In these embodiments and others, the outer housing can have a circular cross section in a plane parallel to the input side.

In some embodiments, the outer housing can be tapered such that a cross sectional area of one of the ends of the outer housing is smaller than a cross section area of the end.

Set back boxes of the invention can also be adapted to mount in a display or in a wall. For mounting in a display, the set back box can comprise a flange on the outer housing arranged such that the input side is exterior to the display and the input side is inside the display. For mounting in a wall, the set back box can comprise a flange on the outer housing arranged such that the input side is on an interior side of the wall and the output side is on the exterior side of the wall. These embodiments make the set back box easier to hide.

The set back box can also comprise a two part outer housing having an upper component, a lower body component and at least one connection cable bridging the upper and lower components for signal transmission therebetween, wherein a strain relief cable can bridge the upper and lower components to ensure that any connection cables are not under tension. The stacked printed circuit boards can be in one of the components.

The set back box can comprise a flange on the upper component adapted to mount the set back box in a display wall such that the input side is exterior to the display and the output side is inside the display. On the other hand, the set back box can comprise a flange on the upper component adapted to mount the set back box to a wall such that the input side is on an interior side of the wall and the output side is on the exterior side of the wall.

BRIEF DESCRIPTION OF THE DRAWINGS

The invention will now be described by way of example with reference to the accompanying figures which are as follows.

DETAILED DESCRIPTION OF THE EMBODIMENTS

The set back box 13 which will now be described was developed to be a low cost device adapted to provide cable, satellite or hybrid whole home DVR (digital video recording) services when used in tandem with video gateways. The set back box 13 can also be adapted to receive and decode MPEG content and provide a flexible platform to support a wide range of applications for home networking architectures that can include various Ethernet and coaxial cable standards and WiFi.

Figure 2A:
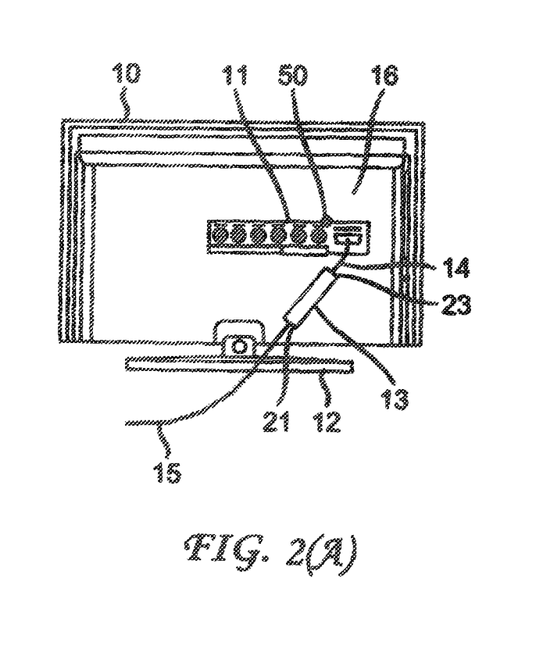
FIG. 2 shows views of a display employing the set back box according to the invention.
Figure 2B:
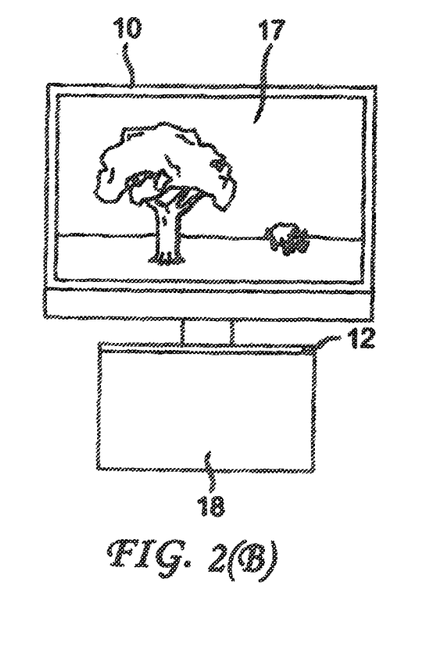
Figure 2C:
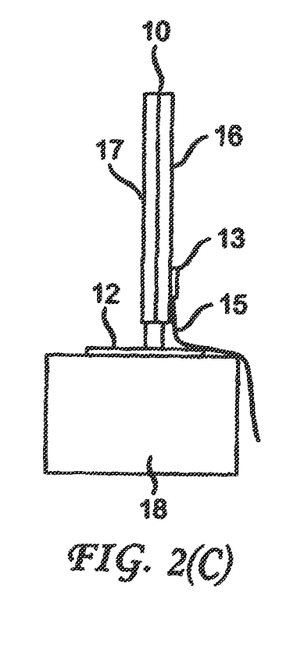

FIG. 2 shows various views of a display 10 employing the set back box 13 of the invention. FIG. 2A is a rear view of the display 10 supported by a base 12 in which the set back box 13 is shown being connected to at least one connector on the panel jack 11 through front cable 14 on the back 16 of the display 10. FIG. 2B shows the front 17 of the display 10 which demonstrates how the set back box is hidden from view and FIG. 2C shows a side view of the display 10 showing the rear cable 15 from which the set back box can receive external signal from a cable or satellite provider or some network. To further aid in hiding the set back box 13 from view, the set back box can be equipped with a radio frequency remote receiver (which is not shown and can be in the set back box or on the set back box). An IR receiver (not shown) could likewise be used; however, the IR receiver may have to be somewhat in the field of view to receive signals from a remote control. It should be noted that although working electrical cables may be described as being input or output cables, these cables can provide two-way electrical communication and individual cables can transmit signal in either direction.

Figure 3A:
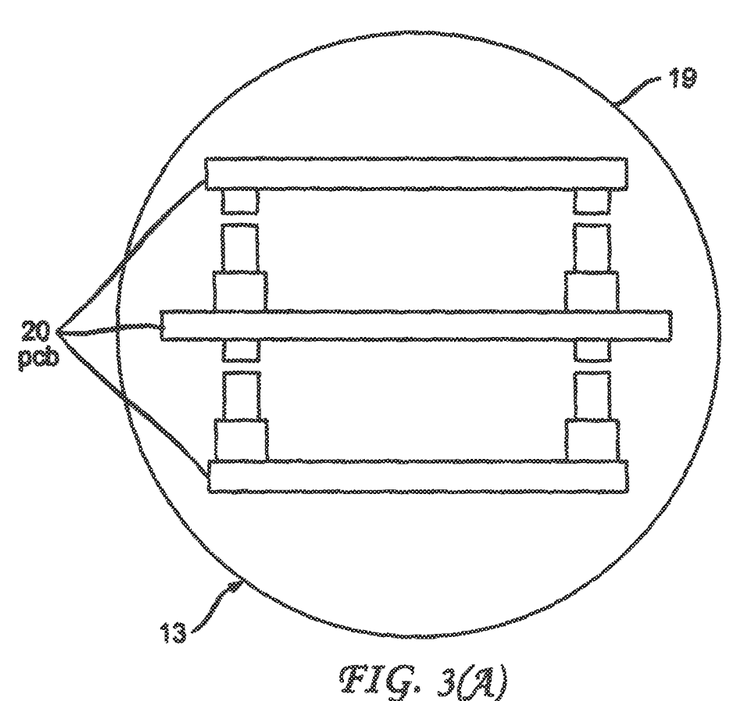
FIG. 3 shows an interior view and the panel jack of the set back panel according to the invention.
Figure 3B:
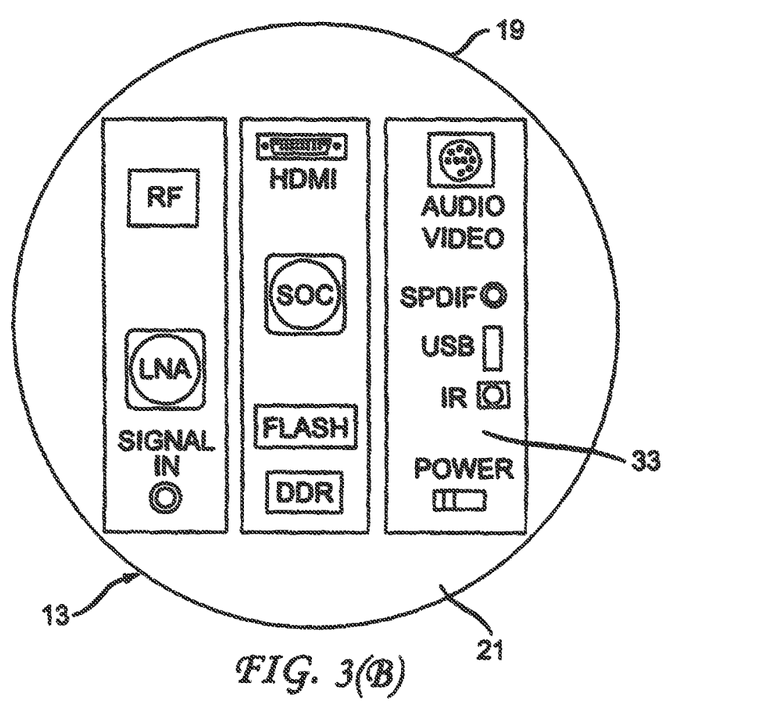

FIG. 3A shows an interior view of the set back box 13 and FIG. 3B shows the set back box panel jack/control button cluster 33 on the rear end or wall 21 of the set back box 13. In a preferred embodiment, the exterior wall 19 of the set back box 13 is cylindrical and the printed circuit board assembly is not a single conventional printed circuit board, but rather is three printed circuit boards 20. The rear wall 21 is essentially the input side of the set top box 13. The printed circuit boards 20 are stacked to substantially reduce the cross sectional area and reduce the width of the set back box. It should be noted that having stacked or split circuit boards 20 in a set back box 13 may not be considered desirable by some in the case of a set back box 13 employing high speed network protocols (e.g. gigabit Ethernet standard), because conventional ribbon cables that are used to connect high speed signal between circuit boards can substantially attenuate high speed signals; however, some special flat print circuit connection cables can be utilized to permit the construction and the use of stacked boards 20 in FIG. 3A in high speed routing systems.

Figure 4A:
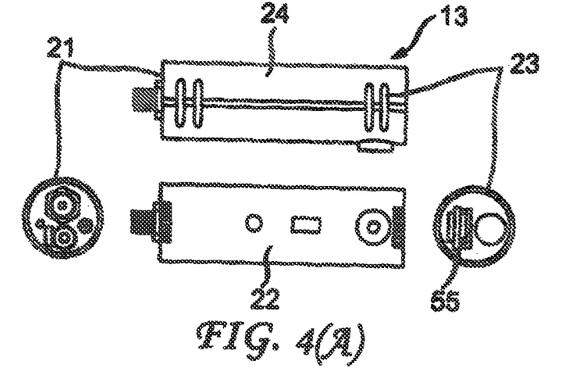
FIG. 4 shows different types of set back boxes according to the invention.
Figure 4B:
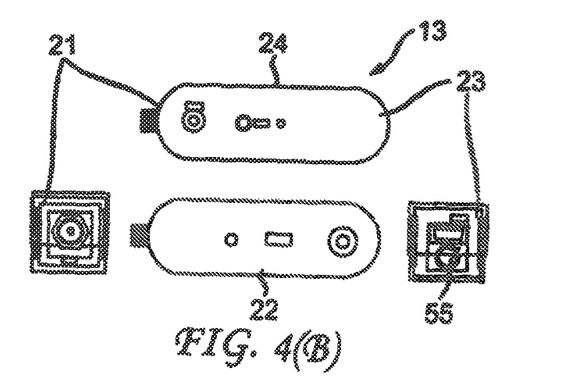
Figure 4C:
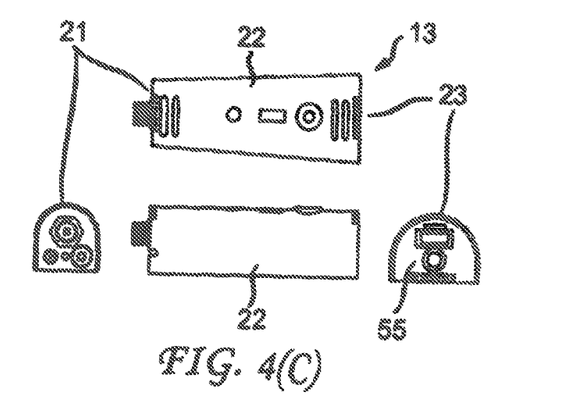

FIGS. 4A, 4B, and 4C each show different types of designs for the set back box 13 according to the invention and how buttons, jacks, connectors, etc. can be positioned. Each of the figures shows a view of the top 22, the rear end 21, and the front end 23 of the set back boxes 13. The front ends 23 can essentially be the output side of the set back box 13 and can have output panel 55. FIGS. 4A and 4B also include views of the bottom 24 of the set back boxes 13. FIG. 4C shows a side view of a side 22 of the set back box 13. As shown in these views of FIGS. 4B and 4C, the set back boxes can have at least one elongated side that is generally planar and the at least one side can have control buttons or jacks on them. Hence, cables and/or control buttons can be on three sides of a set back box 13. FIG. 4B shows that the set back box 13 can have a rectangular cross section and FIG. 4C shows that the set back box 13 can have a tapered cross section in which the cross sectional area decreases from the front end 23 toward the rear end 21.

Figure 5:
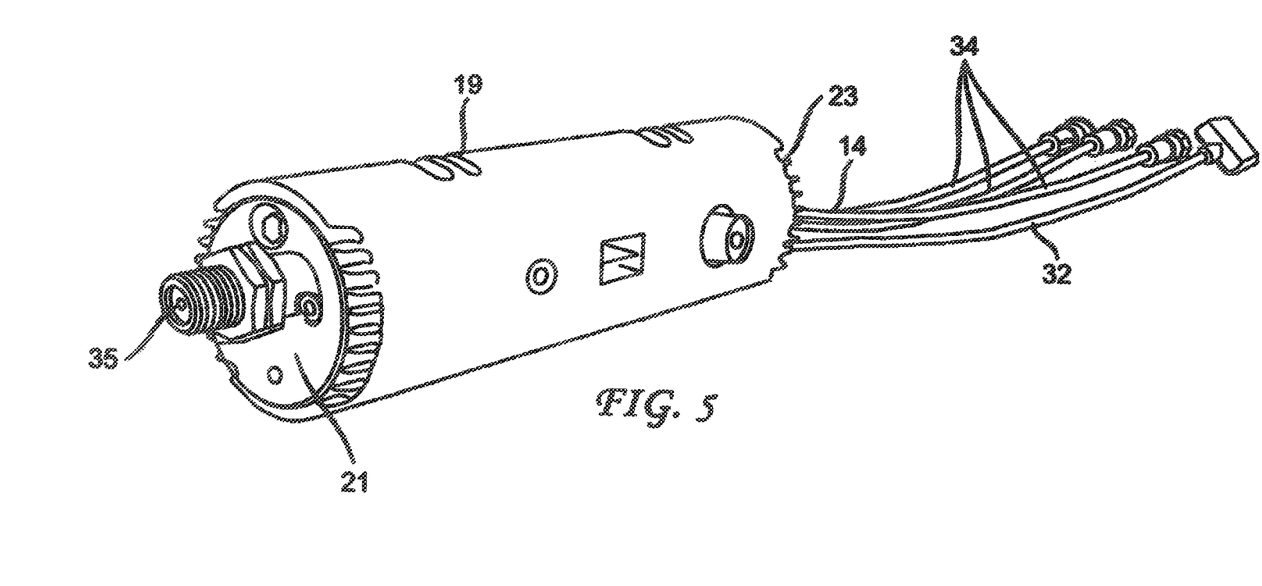
FIG. 5 shows a perspective view of the set back box incorporating a strain relief cable according to the invention.

FIG. 5 shows a perspective view of the set back box 13 incorporating a strain relief cable 32. The strain relief cable 32 helps to facilitate the in-line product scheme of the set back box 13 as shown in FIG. 2 in which rear end 21 has a input coaxial connector 35 on rear end 21 which can face downward. The strain relief cable 32 can be on the front wall 23 which can face upward and can be on the output side toward the display. The strain relief cable 32 will be next to the front cables 14 which can be audio and/or video cables 34. The strain relief cable 32 is preferably shorter than any of the front cables. Thus, there is essentially no pulling force on any of the connectors on the panel jack 11 components to which the front cables 14 are attached to the display 10. The strain relief cable 32 can be attached to a strain relief cable holder 50 (shown in FIG. 2A) which can be attached or built in the back 16 of the display 10 which can be next to the panel jack 11 or incorporated in the panel jack 11.

Figure 6:
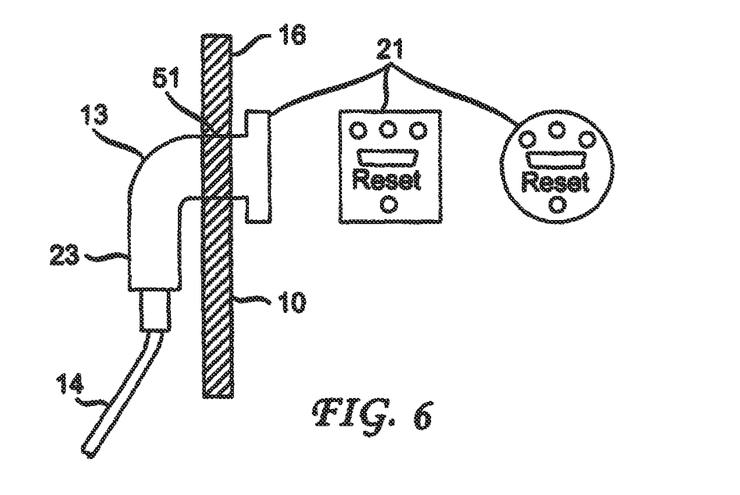
FIG. 6 shows a side view of one implementation of the set back box mounted in a display according to the invention.
Figure 7:
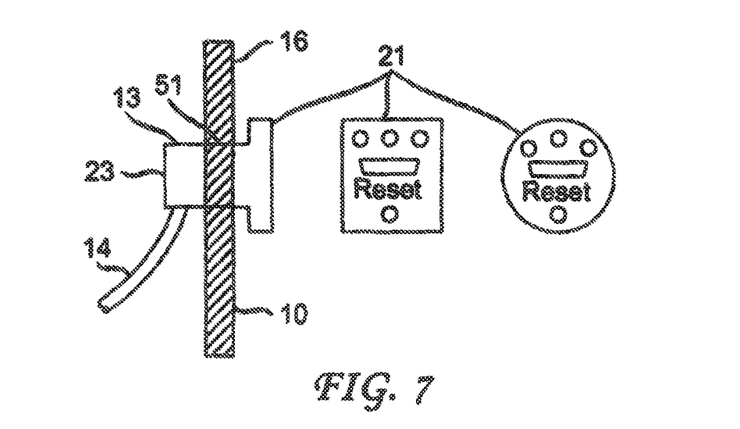
FIG. 7 shows a side view of another implementation of the set back box mounted in a display according to the invention.

FIGS. 6 and 7 show side views of two implementations of the set back box 13 according to the invention in which the set back box 13 is actually attached to the back 16 of the display 10 through a flange 51. FIGS. 6 and 7 also show plan views of two possible rear wall configurations in which one configuration is circular and another is rectangular. The flange 51 can be either on the display or on the set back box 13 components.

The rear wall 21 of the set back box 13 is on the exterior side of the back 16 and the front wall 23 is on the interior side of the back 16. FIG. 7 shows that the front cables 14 can be on a side of the set back box 13 and not on the front wall 23. In both implementations, the rear end 21 can be on the outside of the display 10.

Figure 8A:
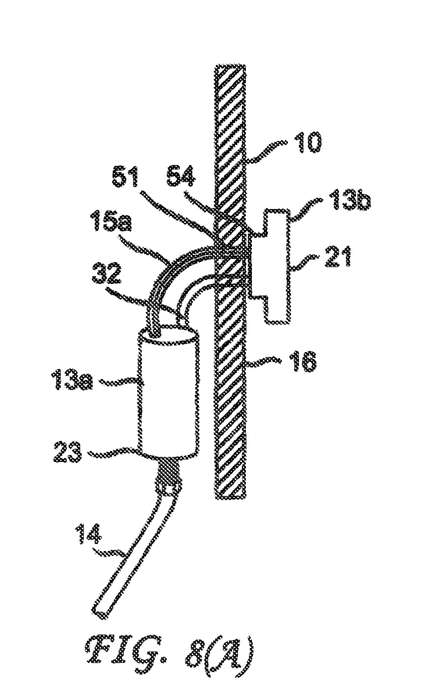
FIG. 8 shows views of a two body configuration of the set back box according to the invention.
Figure 8B:
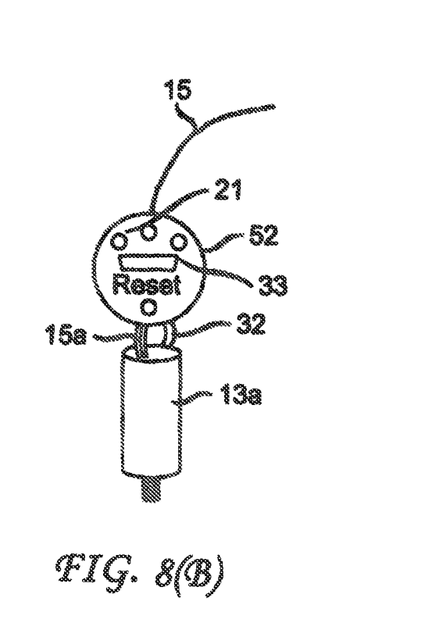

FIG. 8 shows views of a two body configuration of the set back box 13a, 13b according to the invention having an upper body component 13b and lower body component 13a. FIG. 8 shows how the invention can incorporate packaging to allow the set back box 13a, 13b to occupy space behind the back 16 of the display. The assembly can contain a flange 51 to mount the upper component 13b. The upper component 13b can have the rear end 21 which contains the box panel jack/control button cluster 33. The upper body component 13b has a connecting side 54 from which rear connection cables 15a and strain relief cable 32 will be attached. The strain relief cable 32 is next to the rear connection cables 15a. The strain relief cable 32 is preferably shorter than any of the rear connection cables 15a. The rear connection cables 15a permit signal communication between rear cables 15 and the lower body component 13a. The lower body component 13a contains the printed circuit boards 20 as shown in FIG. 3.

Figure 9:
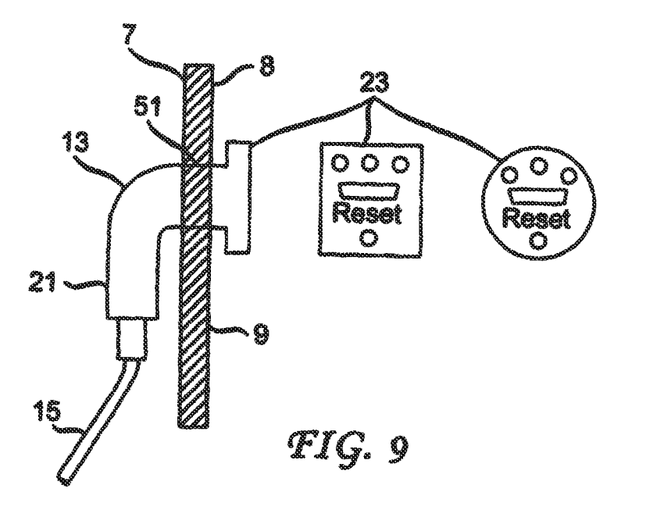
FIG. 9 shows a side view of one implementation of the set back box mounted in a wall according to the invention.
Figure 10:
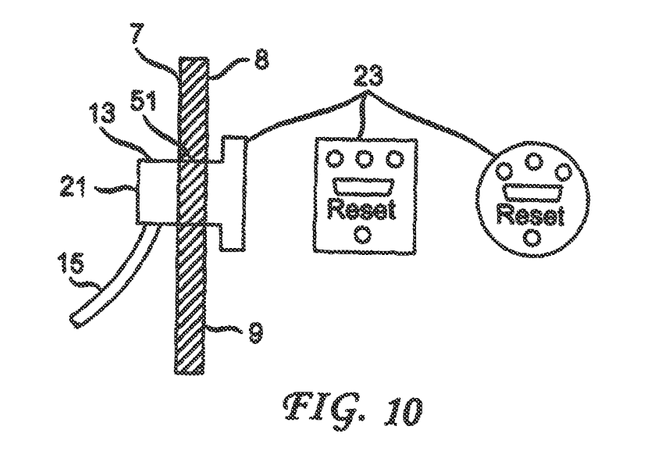
FIG. 10 shows a side view of another implementation of the set back box mounted in a wall according to the invention.

FIGS. 9 and 10 show side views of two implementations of the set back box 13 according to the invention which are similar to the configurations in FIGS. 6 and 7. Here, however, the set back box 13 is actually mounted in a wall 9 in which the wall 9 has an interior side 7 and an exterior side 8 that faces the display 10 (not shown). The set back box 13 is mounted in an aperture of the wall in which a mounting flange 51 can be utilized. In these implementations the front walls 23 and rear walls 21 are the reverse of the configurations in FIGS. 6 and 7. FIGS. 9 and 10 also show plan views of two possible front wall 23 configurations in which one configuration is circular and another is rectangular. The flange 51 can be either on the wall or on the set back box 13 components. If an aperture in the wall 9 is appropriately sized, it may not be necessary to use an actual flange. The rear wall 21 of the set back box 13 is on the interior side 7 of the wall 9 and the front wall 23 is on the exterior side 8 of the wall 9. FIG. 10 shows that the front cables 14 can be on a side of the set back box 13 and not on the front wall 23.

Figure 11A:
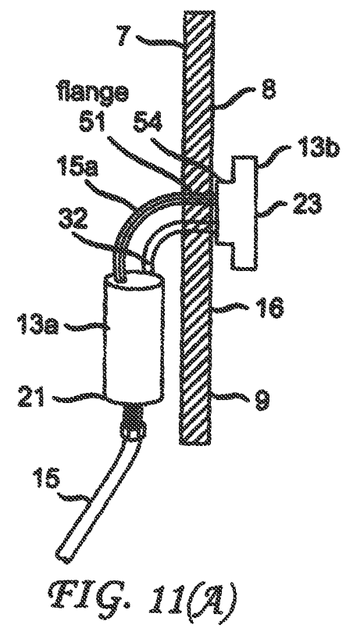
FIG. 11 shows views of a two body configuration of the set back box mounted in a wall according to the invention.
Figure 11B:
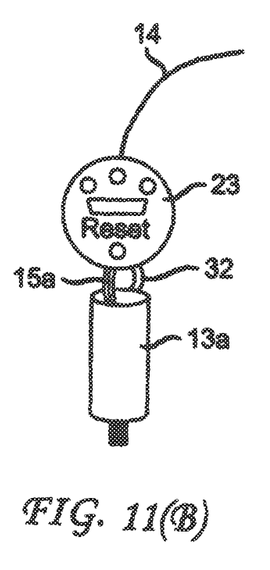

FIG. 11 shows views of a two body configuration of the set back box 13a, 13b according to the invention having an upper body component 13b and lower body component 13a which is similar to the configuration in FIG. 8. FIG. 11 shows how the invention can incorporate packaging to allow the set back box 13a, 13b to occupy space behind a wall 9 in which the wall 9 has an interior side 7 and an exterior side 8 that faces the display 10 (not shown). The assembly can contain a flange 51 to mount the upper component 13b. The upper component 13b can have the front end 23 at one end and an opposing connecting side 54 on another end from which rear connection cables 15a and strain relief cable 32 will be attached. The strain relief cable 32 is next to the rear connection cables 15a. The strain relief cable 32 is preferably shorter than any of the rear connection cables 15a. The rear connection cables 15a permit signal communication between rear cables 15 and the lower body component 13a. The lower body component 13a contains the printed circuit boards 20 as shown in FIG. 3. Front cables 14 extending from front wall 23 can connect to the display 10 through the panel jack 11 shown is FIG. 2A. It should be noted that the strain relief cables 32 can be cables, cords, wires, ribbons, or tape that are not an electrical components.

The foregoing illustrates only some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

Other devices could benefit from this packaging style and application of the disclosed invention such as cable modems, DSL modems, VoIP devices, etc.

The invention claimed is:

1. A set back box comprising:
an outer housing having one input side and one output side;
printed circuit boards within the outer housing;
an input panel for receiving at least one input electrical cable at the one input side; and
an output panel for providing at least one output signal to a display through at least one signal output cable at the output side, said output cable being configured to be connected to at least one existing signal input of the display,
wherein the outer housing comprises a first body component, a second body component and at least one connection cable bridging the first and second body components for signal transmission therebetween, the first body component having the input side and the second body component having the output side, the first body component and second body component are mechanically separated from one another and are separate components from the display; and
wherein the first body component is configured to mount the set back box to a wall.

2. The set back box of claim 1, further comprising a strain relief cable bridging the first and second body components and connected to the first and second body components, the strain relief cable being configured to ensure the at least one connection cable is not under tension.

3. The set back box of claim 1, wherein the printed circuit boards are stacked within the outer housing, and wherein there are at least three stacked printed circuit boards, the stacked printed circuit boards are parallel to one another, and the stacked printed circuit boards are oriented perpendicular to at least one of the sides.

4. The set back box of claim 3, wherein a first printed circuit board of the three printed stacked circuit boards is over a second printed circuit board of the three printed stacked circuit boards and a third printed circuit board of the three printed stacked circuit boards is under the second printed circuit board, the second printed circuit board being wider than the first and second printed circuit boards along a dimension parallel to the input side.

5. The set back box of claim 4, wherein the second body component has a circular cross section in a plane parallel to the input side.

6. The set back box of claim 3, wherein the stacked printed circuit boards are in the second body component.

7. The set back box of claim 1, wherein the first body component comprises a flange configured to mount the set back box on the wall such that the wall is part of the display and the input side is exterior to the display and a side of the first body component opposite the input side is directed inside the display.

8. The set back box of claim 1, wherein there are three printed stacked circuit boards in the second body component, a first printed circuit board of the three printed stacked circuit boards being over a second printed circuit board of the three printed stacked circuit boards and a third printed circuit board of the three printed stacked circuit boards being under the second printed circuit board, the second printed circuit board being wider than the first and second printed circuit boards along a dimension parallel to the output side.

9. The set back box of claim 1, wherein the first body component comprises a flange configured to mount the set back box to the wall such that the wall is part of the display and the input side is on an interior side of the wall and the output side is on the exterior side of the wall.

10. The set back box of claim 1, wherein the first component of the outer housing is an upper component, the second component is a lower component; and wherein the upper component is configured to mount the set back box to the wall such that the wall is part of the display and the input side is on an interior side of the wall and the output side is on the exterior side of the wall.

11. The set back box of claim 10, further comprising a strain relief cable bridging the upper and lower components, the strain relief cable being configured to ensure that any connection cables are not under tension.

12. The set back box of claim 11, further comprising stacked printed circuit boards in the lower component.

* * * * *